H. C. ROSS.
MILLING MACHINE.
APPLICATION FILED APR. 6, 1917.
1,274,084.
Patented July 30, 1918.
3 SHEETS—SHEET 2.
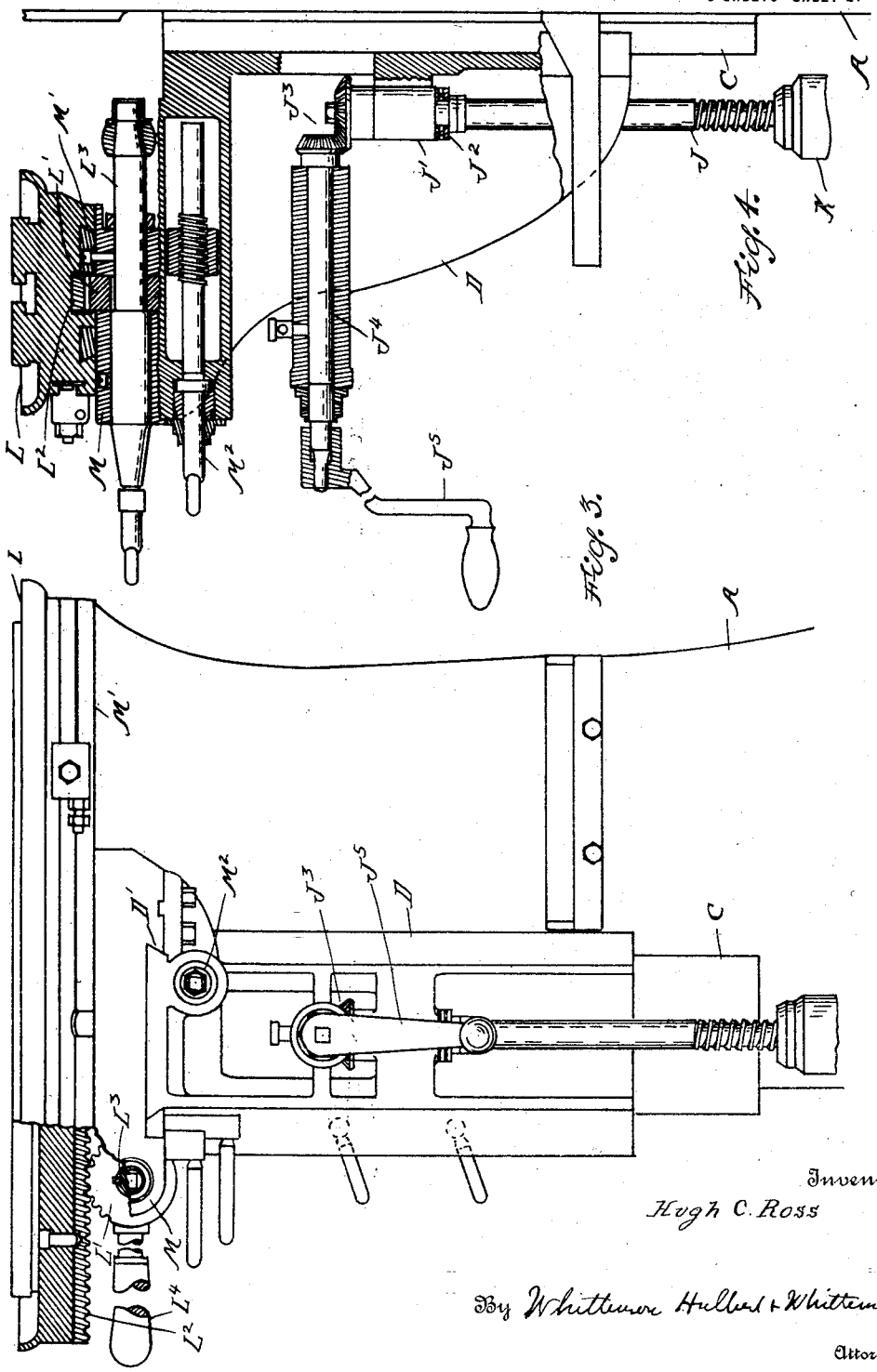
Inventor
Hugh C. Ross
By Whittemore Hulbert & Whittemore
Attorneys

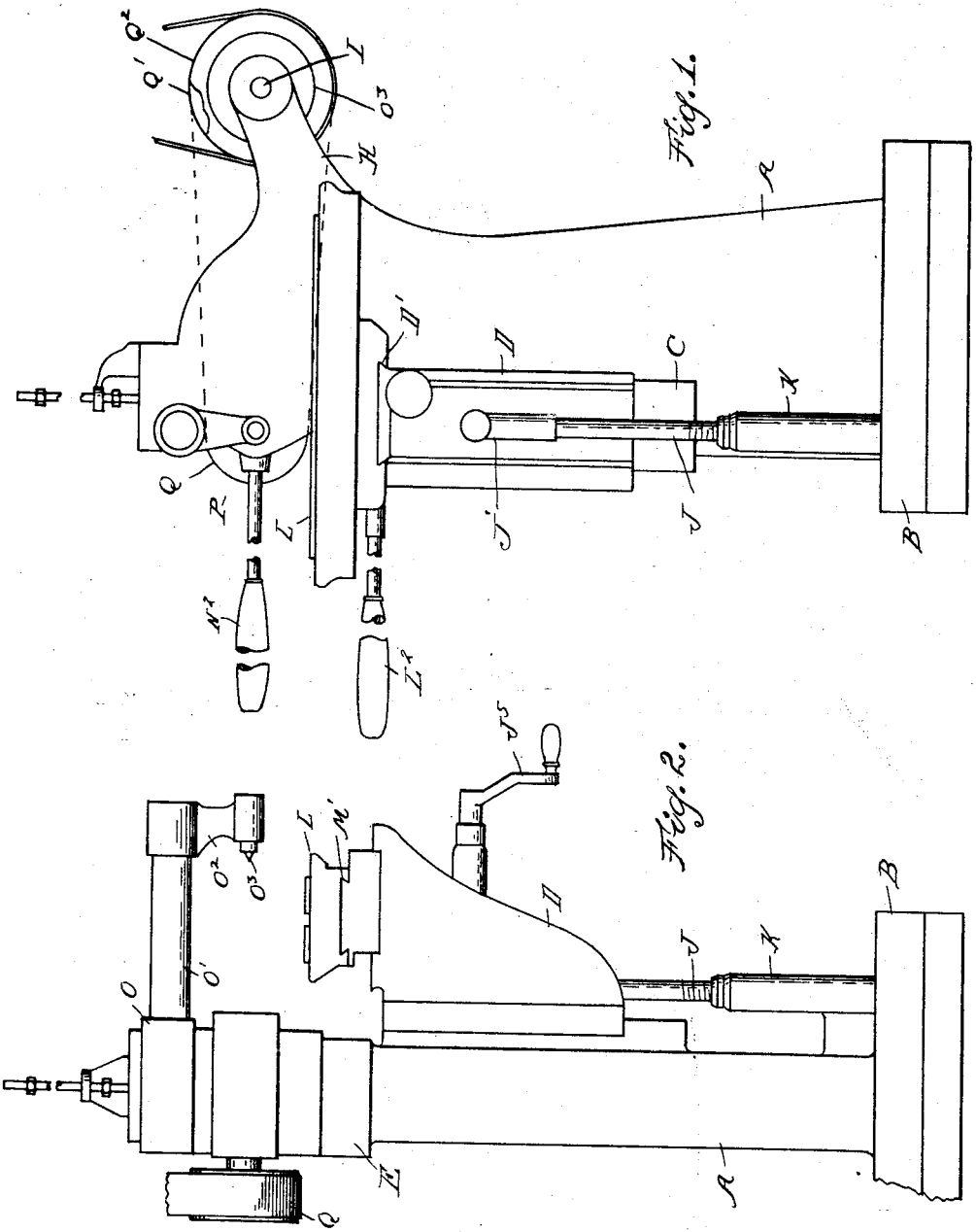

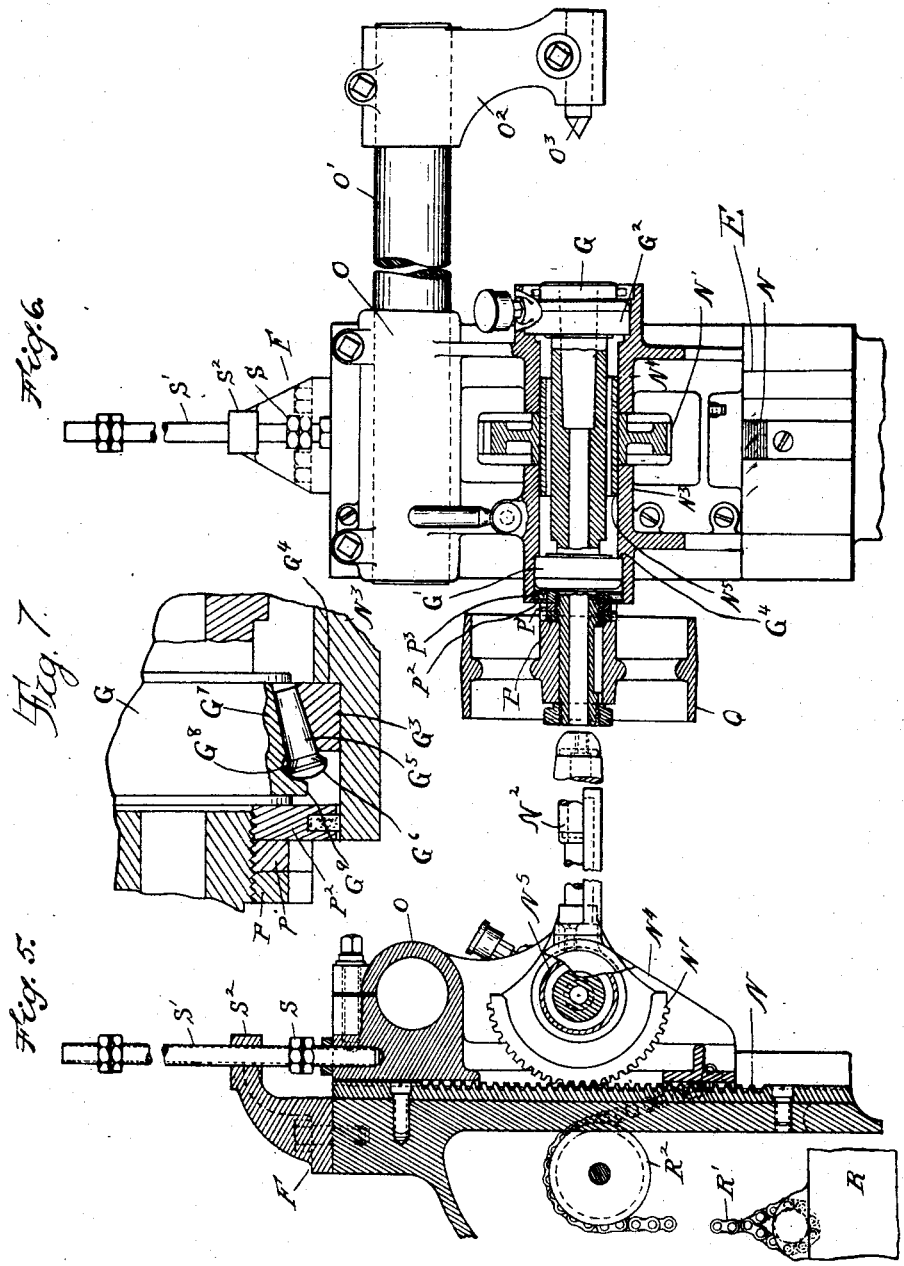

UNITED STATES PATENT OFFICE.

HUGH C. ROSS, OF TOLEDO, OHIO, ASSIGNOR TO THE KENT-OWENS MACHINE COMPANY, OF TOLEDO, OHIO, A CORPORATION OF OHIO.

MILLING-MACHINE.

1,274,084.   Specification of Letters Patent.   Patented July 30, 1918.

Application filed April 6, 1917. Serial No. 160,134.

*To all whom it may concern:*

Be it known that I, HUGH C. Ross, a citizen of the United States of America, residing at Toledo, in the county of Lucas and State of Ohio, have invented certain new and useful Improvements in Milling-Machines, of which the following is a specification, reference being had therein to the accompanying drawings.

The invention relates to machine tools and has more particular application to milling machines. It is the primary object of the invention to obtain a higher efficiency or speed in the performance of work, and further to obtain various features of advantage as hereinafter set forth.

In the drawings:

Figure 1 is a side elevation of the machine;

Fig. 2 is a front elevation thereof;

Fig. 3 is a sectional side elevation of a portion of Fig. 1;

Fig. 4 is a cross-section thereof;

Fig. 5 is a longitudinal section of the upper portion of the machine;

Fig. 6 is a sectional front elevation thereof;

Fig. 7 is an enlarged cross-section through one of the bearings.

In the construction of machine tools having revolving spindles for carrying either the work or the cutter, it is usual to provide journal-bearings with extended parallel faces. This necessarily introduces a large friction element and requires careful lubrication. Anti-friction bearings of the ball-and-roller type are commonly used in various mechanisms but have not been successfully applied to machine tools. This is for the reason that great accuracy is the all essential characteristic of a rotating spindle in a machine tool, and with anti-friction bearings as heretofore constructed and applied such accuracy cannot be maintained. The present invention has overcome the difficulty by providing the rotating spindle with anti-friction roller bearings of such construction as to take care of both radial and end thrust without appreciable wear or change in adjustment to destroy the accuracy. This improvement together with various other features of construction have resulted in a tool capable of performing its work much more expeditiously than with constructions heretofore devised. In detail, A is a frame or pedestal provided with a suitable supporting base B, and also provided on one side with a vertical guideway C for the vertically-adjustable work-supporting bracket D. The frame is also provided at its front with a vertical guideway E for the adjustable head F carrying the revoluble spindle G. At the rear of the frame is a bifurcation H in which is journaled a countershaft I.

The work-supporting bracket-arm D is vertically adjusted by suitable mechanism, preferably comprising a threaded vertically-extending shaft J engaging a threaded post member K rising from the base B. The shaft J engages a bearing J' on the arm D, being provided with an anti-friction thrust bearing J², and bevel gear-wheels J³ connect the shaft with a horizontally-extending shaft J⁴ provided with an operating crank-handle J⁵. L is a work-table which is longitudinally adjustable on the bracket-arm D by means of a pinion L' engaging a rack-bar L². The pinion is mounted upon the shaft L³ which is journaled in a sub-base M having the guideways M' for the table L, and the sub-base is transversely adjustable upon a guideway D' on the arm D by means of the adjusting screw M². Thus by means of the several adjustments described the table may be adjusted in three directions at right angles to each other.

The head F on which the arbor G is mounted is vertically adjusted by means of a rack N on the frame A, which is engaged by a segmental rack N' connected to an adjusting lever N². The segmental rack N' is arranged between the furcations N³ and N⁴ of a hollow bifurcated bearing member integral with the head F through which the spindle G is passed. The journal or fulcrum for the segmental rack member N is formed by a bushing N⁵, which is inserted through one of the hollow furcations and bridges the space therebetween. O is a hollow bearing member having its axis parallel to the axis of the spindle G and supporting the rod O', which carries at its free end a bracket member O² for holding a center O³ in alinement with the spindle.

As has been stated, the spindle G is mounted in anti-friction bearings, which are of such a character as to maintain a fixed axis of rotation, taking care of both radial and end thrust without appreciable wear. Preferably a pair of similar roller-bearing units G' and G² are arranged at opposite ends of the hollow furcations N³ and N⁴, each being of the following construction: G³ is a conical race-member having a shouldered engagement G⁴ with the hollow bearing member N³ or N⁴. G⁵ are conical rolls engaging the race member G³ and provided at their large ends with enlarged heads G⁶. G⁷ is an inner conical race-member bearing against the conical rolls, having a groove G⁸ provided clearance for the enlarged heads G⁶. G⁹ is a projecting collar on the cone G⁷, which has a bearing face contacting with the enlarged head of each of the rolls at a point in alinement with the line of contact between said rolls and the conical inner race-member. This bearing-face also extends symmetrically upon opposite sides of the point of contact with the surface of the enlarged heads and with but slight angular divergence,—so that the contacting point is strongly reinforced equally on all sides.

The roller-bearing unit just rescribed, and which per se forms no part of the present invention, is adapted when arranged and combined with other portions of the structure as described to maintain the spindle G in true alinment. The collars P and P', having a threaded engagement with the spindle, may be adjusted to form a bearing for the inner conical race-member G⁷ in taking up all back-lash and holding the spindle from lost-motion either radially or endwise. A collar P² provided with a packing P³ forms an oil and dust joint between the spindle and the hollow member N³, and a similar packing at the opposite end of the spindle will serve to retain the lubricant within the hollow chamber.

For driving the spindle G a pulley Q is mounted on the portion projecting from the rear end of the bearing, which pulley is connected by a belt with an alined pulley Q' on the countershaft I, said shaft having also mounted thereon a drive-pulley Q² and a pulley Q³ for driving an oil-pump (not shown). R is a counterweight for the work-supporting arm D, which is arranged within the hollow pedestal and is connected by a chain R' passing over a sheave R² to the upper part of said arm.

With the construction as described in operation, the spindle G may be driven at a relatively high angular speed, and on account of the roller-bearings with very little friction. When a rotary cutter or other tool is mounted on the spindle the work may be performed by a relative adjustment of the head F and work-table L. The lever N², operating the segmental rack N', may be used for lowering and raising the tool into and out of the work, and stops, such as the nuts S on a vertical rod S' on the head F passing through a bearing S² on the frame, serve to limit the adjustment. The work-table L is preferably also reciprocated by means of a lever L⁴ on the shaft L³, which actuates the pinion L' and rack L², thereby facilitating quick adjustment and the rapid performance of the work. During the performance of work the vertical and transverse adjustments of the work-table may be locked by any suitable means, so as to hold the table rigid excepting for the particular adjustment required.

What I claim as my invention is:

1. In a machine tool, the combination with a revoluble spindle, of a hollow bifurcated supporting member through which said spindle passes, roller bearing units mounted in said hollow supporting member at opposite ends thereof and engaging said spindle to take care of both radial and end-thrust, a bushing insertible in said hollow member to bridge the space between the furcations thereof and surrounding and spaced from said spindle, a guide on which said hollow supporting member is adjustably mounted, and adjusting means for said hollow member on said guide including a lever fulcrumed upon said bushing between said furcations.

2. In a machine tool, the combination with a frame, of a head adjustably guided on said frame, a hollow bifurcated member upon said head, a spindle passing through said hollow bifurcated member, roller bearing units mounted in opposite ends of said hollow bifurcated member and engaging said spindle to take care of both radial and end-thrust, a bushing inserted in said hollow bifurcated member to bridge the space between the furcations thereof and surrounding and spaced from said spindle, a gear-segment journaled on said bushing between said furcations, and a rack on said frame meshing with said gear-segment and coöperating therewith for the adjustment of said head.

3. A machine tool, comprising a frame or standard, a vertical guideway on the upper portion of said standard, a head adjustable on said guideway and provided with a hollow bifurcated projection, a rotary spindle passing through said hollow bifurcated projection, roller bearing units mounted in opposite ends of the furcations and engaging said spindle to take care of both radial and end-thrust, a bushing insertible through one of said hollow members to bridge the space between the furcations and surrounding and spaced from said spindle, a gear-segment journaled on said bushing, a rack on said standard in mesh with said segment, and a lever for rocking said segment to adjust said head upon said standard.

4. In a machine tool, the combination with a frame or standard, of a head vertically adjustable upon the upper portion of said standard, hollow bifurcated bearings on said head, a spindle passing through said hollow bifurcated bearings, roller bearing units mounted in said furcations and engaging said spindle to take care of both radial and end-thrust, a bushing insertible through one of said furcations and bridging the space between the same, said bushing surrounding and spaced from said spindle, a gear-segment journaled on said bushing, a lever for rocking said segment, a rack on said standard in mesh with said segment and coöperating therewith and said lever for the adjustment of said head, a hollow bearing on said head parallel to said spindle, a rod adjustably clamped in said hollow bearing, an arm carried by the outer end of said rod, and a center mounted in said arm in axial alinement with said spindle.

5. The combination with a frame or standard, of vertical guide bearings on said standard on sides thereof at right angles to each other, a head adjustably secured to one of said guide bearings and provided with a bifurcated hollow bearing, a spindle passing through said bifurcated hollow bearing, roller bearing units mounted in the furcations and engaging said spindle to take care of both radial and end-thrust, a gear-segment journaled between said furcations and provided with an operating lever for rocking the same, a rack on said standard coöperating with said gear-segment for the vertical adjustment of said head, a bracket member vertically adjustable on the guide on said frame at right angles to the first-mentioned guide, a work-table supported on said bracket, means for vertically adjusting said bracket, and means for adjusting said work-table in transverse directions.

6. In a machine tool, the combination with a revoluble spindle, of a hollow bifurcated supporting member through which said spindle passes and in which said spindle is rotatably mounted, a bushing insertible in said hollow member to bridge the space between the furcations thereof and surrounding and spaced from said spindle, a guide on which said hollow supporting member is adjustably mounted, and adjusting means for said hollow member on said guide including a lever fulcrumed upon said bushing between said furcations.

In testimony whereof I affix my signature.

HUGH C. ROSS.

Copies of this patent may be obtained for five cents each, by addressing the "Commissioner of Patents, Washington, D. C."